United States Patent
Lee (10) Patent No.: US 9,235,279 B2
(45) Date of Patent: Jan. 12, 2016

(54) WAKE UP METHOD AND OPTICAL INPUT DEVICE USING THE SAME

(71) Applicant: PIXART IMAGING INC., Hsin-Chu (TW)

(72) Inventor: Siew Chin Lee, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 96 days.

(21) Appl. No.: 14/053,149

(22) Filed: Oct. 14, 2013

(65) Prior Publication Data

US 2015/0103008 A1    Apr. 16, 2015

(51) Int. Cl.
  *G06F 3/038*  (2013.01)
  *G06F 1/32*   (2006.01)
  *G06F 3/0354* (2013.01)

(52) U.S. Cl.
  CPC ............ *G06F 3/0383* (2013.01); *G06F 1/3259* (2013.01); *G06F 3/03543* (2013.01); *G06F 2203/0384* (2013.01)

(58) Field of Classification Search
  None
  See application file for complete search history.

(56) References Cited

U.S. PATENT DOCUMENTS

2005/0110746 A1*  5/2005  Hou ............................. 345/156
2005/0243917 A1* 11/2005  Lee ........................... 375/240.03

* cited by examiner

*Primary Examiner* — Kenneth B Lee, Jr.
(74) *Attorney, Agent, or Firm* — Li & Cai Intellectual Property (USA) Office (57) ABSTRACT

An exemplary embodiment of the present disclosure provides a wake up method and an optical input device using the same. The method includes the following steps. A first image is captured and set as a reference frame when the optical input device enters a sleep mode. A second image is captured and set as a compare frame while the optical input device operates in the sleep mode. The second frame is further being compared with the reference frame to generate a histogram difference. Subsequently, whether a peak histogram value of the histogram difference is less than a predetermined threshold is determined. When the determined that the peak histogram value is less than the predetermine threshold, configures the optical input device to operate in an active mode.

16 Claims, 6 Drawing Sheets

WAKE UP METHOD AND OPTICAL INPUT DEVICE USING THE SAME

BACKGROUND

1. Technical Field

The present disclosure relates to an optical input device in particular, to a wake up method of an optical input device and the optical input device using the same.

2. Description of Related Art

An optical mouse, typically includes a light source to illuminate a navigation surface and an image sensor that functions as a miniature digital camera to continually capture images of the illuminated navigation surface and to determine the speed and the direction of the optical mouse being moved across the surface through sequentially comparing frames of image information captured so as to control the movement of a cursor displayed on a monitor.

Recently, optical mice equipped with wireless technology, i.e., wireless optical mice, have been widely used for cursor control operation. A wireless optical mouse generally is battery powered i.e., the wireless optical mouse uses the equipped battery to supply the necessary operating power. The wireless optical mouse further is designed to incorporate power-saving feature such as automatically entering a sleep mode or a hibernate mode after being idled for a period of time and entering an active or a run mode when movement of the optical mouse has being detected so as to conserve power.

Existing methods such as pixmon wakeup algorithm, de-correlation algorithm, and surface quality (SQUAL) wakeup algorithm, are commonly adopted waking up algorithms for waking up the wireless optical mouse from sleep mode. However, method such as pixmon wakeup algorithm merely check for the maximum pixel value and minimum pixel value variation of any instantly captured frames while the wireless optical mouse operates in the sleep mode, hence may not accurately detect whether the wireless optical mouse has been moved. Methods such as the de-correlation algorithm and SQUAL wakeup algorithm on the contrary are much more accurate in movement detection as the former detects correlation between frames and the latter detects surface variation between frames, but both methods require complex and intense computations such as DCR filtering computation and image correlation which in terms consume more power from the battery.

SUMMARY

Accordingly, the present disclosure provides a wake up method and an optic input device using the same. The wake up method can actively and accurately determine whether to wake up an optical input device from a sleep mode by analyzing the histogram of the pixel variations between frames captured during sleep mode without using complex image processing techniques. Such that the power consumed by the optical input device during the sleep mode can be greatly reduced.

An exemplary embodiment of the present disclosure provides a wake up method of an optical input device. The method includes the following steps. A first image is captured and set as a reference frame when the optical input device enters a sleep mode. A second image is subsequently captured and set as a compare frame while the optical input device operates in the sleep mode. The second frame is further being compared with the reference frame to generate a histogram difference. Whether a peak histogram value of the histogram difference is less than a predetermined threshold is subsequently determined. When the determined that the peak histogram value is less than the predetermine threshold, configures the optical input device to operate in an active mode.

An exemplary embodiment of the present disclosure provides an optical input device, which includes a light source, an image capturing unit, and a processing unit. The light source and the image capturing unit are coupled to the processing unit, respectively. The light source operatively illuminates a working surface of the optical input device. An image capturing unit is configured for capturing a plurality of images responsive to a reflected light of the working surface to generate a plurality of frames according to a predetermined frame rate. The processing unit analyzes a movement of the optical input device based on the frames captured.

The processing unit operatively controls the image capturing unit to capture a first image as a reference frame when the optical input device enters a sleep mode and a second image as a compare frame while the optical input device operates in the sleep mode, and compares the compare frame with the reference frame to generate a histogram difference. When the processing unit determines that a peak histogram value of the histogram difference is less than a predetermined threshold, the processing unit drives the optical input device into an active mode.

According to one exemplary embodiment of the present disclosure, the step of computing the histogram difference further includes the following steps. The processing unit compares each pixel value in the compare frame with the corresponding pixel value in the reference frame. The processing unit further computes the histogram difference based on the comparison result.

To sum up, the present disclosure provides a wake up method and an optical input device using the same. The wake up method can accurately determine whether the optical input device has been moved by statistically analyzing a histogram of pixel difference between the frames captured during sleep mode. The optical input device thus can effectively and automatically determine when to wake up from sleep mode using the wake up method while consume less power as reduce the degree of computation complexity of the wake up method is greatly reduced.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

The main spirit of the present disclosure is merely to provide a method for automatically waking up an optical input device from a sleep mode when a user operates the optical input device while utilize minimum power consumption. Information regarding the hardware architecture of the optical input device, the basic operations of the optical input device such as displacement computation, cursor control operation, and methods, or algorithm for putting the optical input device into a sleep mode or a hibernate mode are commonly known to those skilled in the art. Hence detailed explanations are omitted herein, and only the related information concerning the present disclosure will be provided in the present disclosure.

(An Exemplary Embodiment of an Optical Input Device)

Figure 1:
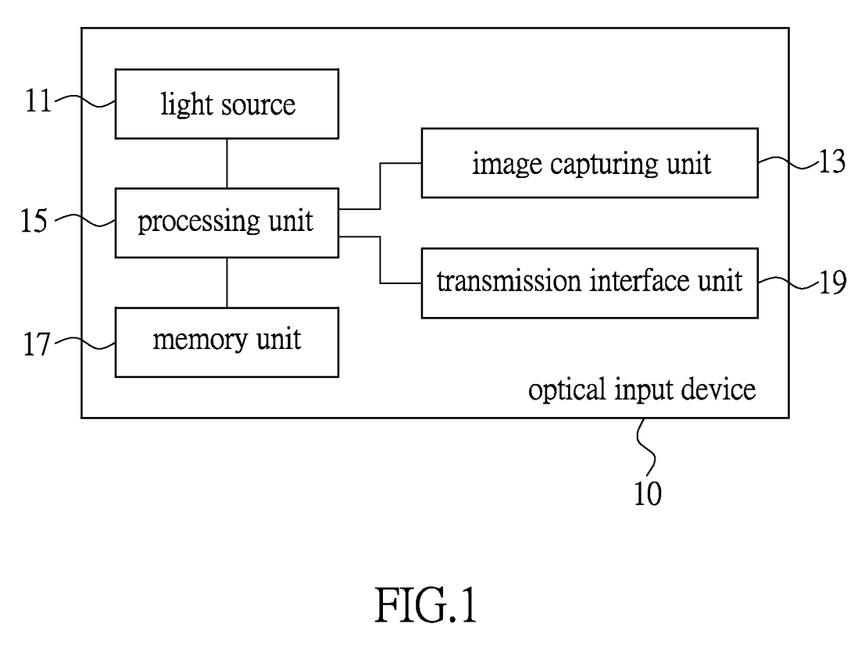
FIG. 1 is a block diagram illustrating an optical input device provided in accordance to an exemplary embodiment of the present disclosure.

Please refer to FIG. 1, which shows a block diagram illustrating an optical input device provided in accordance to an exemplary embodiment of the present disclosure. The optical input device 10 may include but not limited to a wireless optical mouse, a wireless track pad, or a wireless joystick.

In the instant embodiment, the optical input device 10 is further equipped with a battery (not shown) for providing the necessary operational power, wherein the battery may be a dry cell battery. The optical input device 10 is wirelessly connected to a host computer (not shown) and can wirelessly transmit the displacement information computed to the host computer so as to control the movement of a cursor displayed on a monitor connected to the host computer.

While operating in the sleep mode, the optical input device 10 may through sequentially analyzing the statistical difference between each of compare frames captured with the reference frame, determine whether to wake up from sleep mode. Specifically, the optical input device 10 in the instant embodiment can automatically wake up to an active mode when detected that the optical input device 10 has been moved based on the determination result.

To put it concretely, the optical input device 10 includes a light source 11, an image capturing unit 13, a processing unit 15, a memory unit 17, and a transmission interface unit 19. The light source 11, the image capturing unit, the memory unit, and the transmission interface unit 19 are coupled to the processing unit 15, respectively. The processing unit 15 operatively controls the operations of the light source 11, the image capturing unit 13, the memory unit 17, and the transmission interface unit 19.

More specifically, the light source 11 operatively illuminates a working surface (e.g., a mouse pad or a desktop) of the optical input device 10 to generate a reflected light from the working surface. The light source 11 may be implemented by a light-emitting diode or a laser diode. Moreover, in the instant embodiment, the light source 11 comprises of an array of light emitting diodes. However, in practice, the light source 11 may comprise of one or more light emitting diodes depends upon actual operational requirement, and the present disclosure is not limited thereto.

The image capturing unit 13 is configured to capture a plurality image responsive to the reflected light of the working surface so as to sequentially generate a plurality of frames according to a predetermined frame rate. The predetermined frame rate may vary according to the operation mode of the optical input device 10. For instance, when the optical input device 10 operates in the sleep mode, the predetermined frame rate is configured as the sleep mode frame rate e.g., 500 frames per second (fps); when the optical input device 10 operates in the active mode, the predetermined frame rate may be configured as the active mode frame rate, e.g., 1000 fps.

The image capturing unit 13 may be implemented by a charge-coupled device (CCD) image sensor or a complementary metal oxide semiconductor (CMOS) sensor. Those skilled in the art should be able to design according to actual operational application and the instant embodiment is not limited thereto.

The processing unit 15 is the operation core of the optical input device 10. Specifically, the processing unit 15 is configured to analyze a movement of the optical input device 10 based on the frames captured by the image capturing unit 13. The processing unit 15 determines the displacement, the speed, and the direction of the optical input device 10 as the optical input device 10 moves across the working surface by computing image correlation between consecutive frames. Image correlation techniques for computing displacement of an optical input device are known techniques hence further descriptions are hereby omitted.

The processing unit 15 further generates the displacement information according to the determination result and control the transmission interface unit 19 transmitting the displacement information wirelessly to the host computer so as to correspondingly control the movement of the cursor.

Particularly, when the optical input device 10 enters the sleep mode from the active mode, the image capturing unit 13 operatively controlled to capture and store a first image as a reference frame IMG_REF in the memory unit 17. While the optical input device 10 operates in the sleep mode, the image capturing unit 13 operatively controlled to capture a second image as a compare frame IMG_CMP at the predetermined frame rate, i.e., the sleep mode frame rate. That is, while the optical input device 10 operates in the sleep mode, the image capturing unit 13 operatively controlled to sequentially captures a plurality of second image according to the sleep mode frame rate to generate the compare frames IMG_CMP.

Moreover, the first image in the instant embodiment is the very first image captured just after the optical input device 10 enters the sleep mode. Each of the second images is stored as a compare frame IMG_CMP in the memory unit 17 until the next consecutive second image is captured. In other words, the compare frame IMG_CMP is refreshed and updated whenever a new second image is captured while the reference frame IMG_REF stays unchanged.

The processing unit 15 subsequently compares the compare frame IMG_CMP with the reference frame IMG_REF to generate a histogram difference between the compare frame IMG_CMP and the reference frame IMG_REF. The histogram difference herein is the histogram of the pixel difference between the compare frame IMG_CMP and the reference frame IMG_REF computed. The processing unit 15 in the instant embodiment also stores the histogram difference in the memory unit 17 for further access.

Next, the processing unit 15 determines whether a peak histogram value of the histogram difference is less than a predetermined threshold HIS_TH. When the peak histogram value of the histogram difference is determined to be less than the predetermined threshold HIS_TH indicating that the optical input device 10 has been moved, the processing unit 15 operatively causes the optical input device 10 to wake up and operate in the active mode. Conversely, when the peak histogram value of the histogram difference is determined to be greater than the predetermined threshold HIS_TH indicating that the optical input device 10 is stationary, the processing unit 15 operatively causes the optical input device 10 to operate in the sleep mode and simultaneously controls the image capturing unit 13 to generate another compare frame IMG_CMP.

In one embodiment, the processing unit 15 can compare each pixel value in the compare frame IMG_CMP with the corresponding pixel value in the reference frame IMG_REF to compute the pixel difference. The process unit 15 then computes the histogram difference from the pixel difference obtained, i.e., the process unit 15 computes the number of pixels per each pixel difference.

In general, whenever the optical input device 10 is stationary, i.e. has not been moved, the overlapping area between the compare frame IMG_CMP and the reference frame IMG_REF is relatively large as such the peak histogram value computed is larger. Conversely, when the optical input device 10 is in motion, i.e. been moved by the user, the overlapping area between the compare frame IMG_CMP and the reference frame IMG_REF is relatively small and the peak histogram value computed is smaller.

For further understanding over the present disclosure, two simple but illustrative examples are provided. Supposing the optical input device 10 is stationary and operates in the sleep mode. The reference frame IMG_REF has a pixel array of [4 3 2 1] and the compare frame IMG_CMP has a pixel array of [4 3 2 1]. Accordingly, the pixel difference yields a difference array of [0 0 0 0], wherein each value in the difference array is computed as |IMG_CMP[i]−IMG_REF[i]| with i being an integer. The histogram difference for the instant example therefore has an array of [4 0 0 0], with the peak histogram value being 4.

Supposing the optical input device 10 has been moved at the instant, the reference frame IMG_REF still has a pixel array of [4 3 2 1] while the compare frame IMG_CMP captured has change to a pixel array of [1 2 4 3]. The pixel difference yields a difference array of [3 1 2 2]. The corresponding array of the histogram difference computed now becomes [0 1 2 1], with the peak histogram value being 2. Hence, it can be noted that when the optical input device 10 is in motion, the peak histogram value become smaller as the overlapping area become smaller.

The processing unit 15 of the optical input device 10 may thus accurately and effectively determine whether to wake up the optical input device 10 from sleep mode through determining whether the peak histogram value of the histogram difference computed is less than the predetermined threshold HIS_TH. Moreover, it is known to those skilled in the art, pixel difference and histogram of the pixel difference computations are simple computations in field of image processing. Hence the power consumed by the optical input device 10 during sleep mode can be reduced.

Next, the operation of the optical input device 10 is further described with a diagrammatic illustration. Please refer to FIG. 2 in conjunction with FIG. 1, which shows a waveform illustrating the relationship between the wake up operation of the optical input device and the peak histogram value computed provided in accordance to the exemplary embodiment of the present disclosure. Curve C10 illustrates the peak histogram value computed over time.

Figure 2:
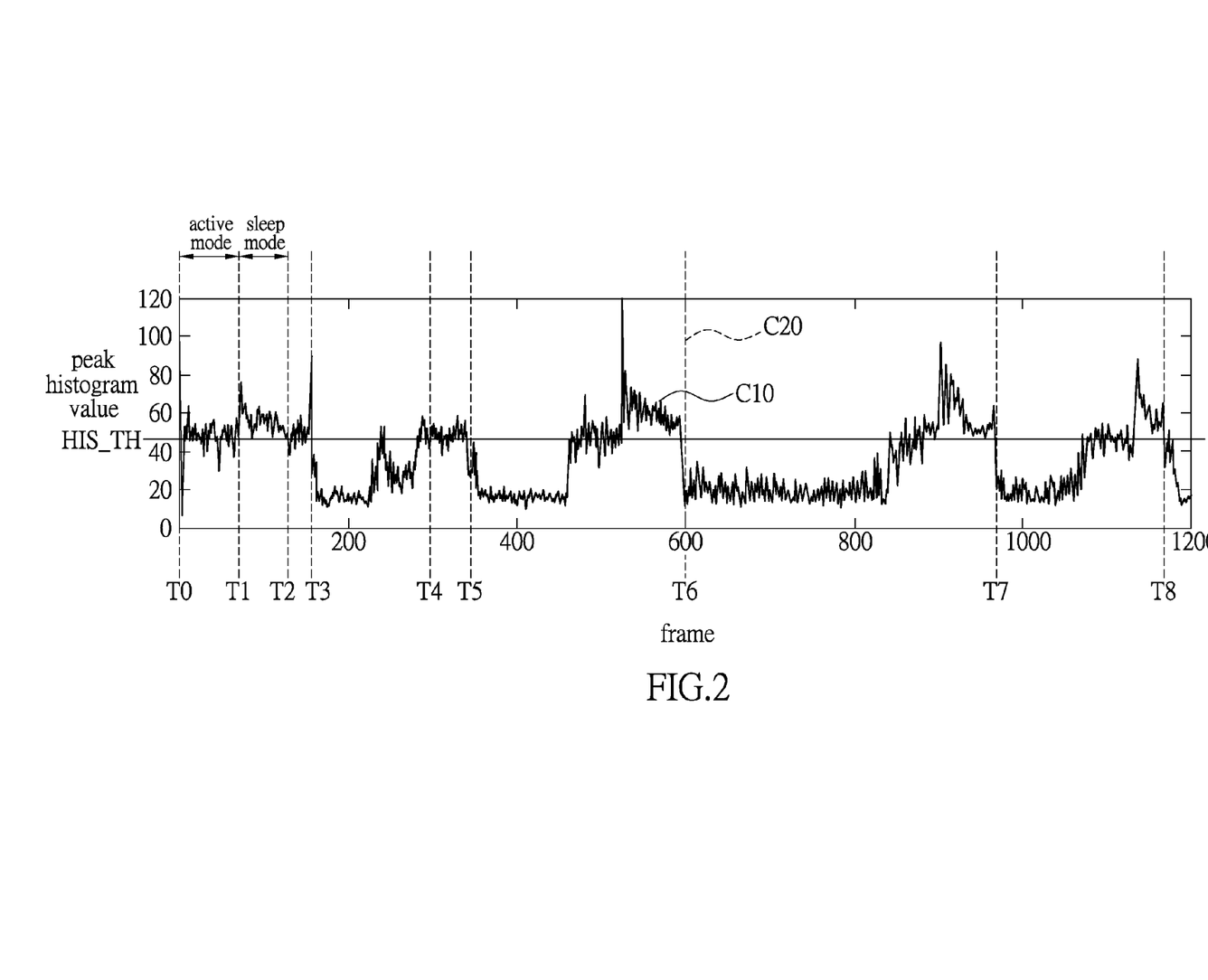
FIG. 2 is a waveform illustrating the relationship between the wake up operation of the optical input device and the peak histogram value computed provided in accordance to an exemplary embodiment of the present disclosure.

The optical input device 10 first operates in the active mode from time point T0 and time point T1 as shown in FIG. 2. While the optical input device 10 operates in the active mode, the processing unit 15 controls the image capturing unit 13 to continuously capture frames at the active mode frame rate predetermined. The processing unit 15 analyzes the statistical information computed between the current and the previous frame captured so as to generate the related displacement information to correspondingly control the cursor movement according to the statistical information computed.

When the optical input device 10 enters the sleep mode (e.g., after being idled or inactive for a period of time), the processing unit 15 controls the image capturing unit 13 capturing a first image (e.g., $100^{th}$ image) to serve as the reference frame IMG_REF. Hereinafter, the processing unit 15 controls the image capturing unit 13 continuously capturing a plurality of second images at the sleep mode frame rate to sequentially serve as the compare frame IMG_CMP. The processing unit 15 then computes the histogram difference between the reference frame IMG_REF and the compare frame IMG_CMP so as to acquire the peak histogram value correspondingly.

When the processing unit 15 determines that the peak histogram value computed is less than the predetermined threshold HIS_TH (e.g., 46), the processing unit 15 determines that the optical input device 10 has been moved. As shown in FIG. 2, while the optical input device 10 operates in the sleep mode, whenever the peak histogram value drops below the predetermined threshold HIS_TH (e.g., curve C10 at time T2, T3, T4, T5, T6. and T7) indicating that the optical input device 10 has been operated by the user, the process unit 15 automatically causes the optical input device 10 to wake up from sleep mode and operates in the active mode.

It is worth to mention that the predetermined threshold HIS_TH in the instant embodiment may be predefined according to operational requirement such as the ability of the image capturing unit 13. In one embodiment, the predetermined threshold HIS_TH may be predefined and stored in memory unit 17 before factory shipment of the optical input device 10. In one embodiment, the predetermined threshold HIS_TH may also be dynamically adjusted according to the instant operating conditions (e.g., an operating temperature, an operating voltage, and/or a noise level of the image capturing unit 13) of the optical input device 10. In one embodiment, the optical input device 10 may be capable to calibrate the operating condition according to the predetermined threshold HIS_TH predefined in the memory unit 17 during the operation of the optical input device 10. Details regarding dynamically adjusting the predetermined threshold HIS_TH and calibrating the operating conditions of the optical input device 10 will be further described in the other embodiment and further descriptions are hereby omitted.

Incidentally, the processing unit 15 may be implemented by a processing chip including but not limited to a microcontroller, or an embedded controller which is programmed with wake up algorithm and disposed in the optical input device 20, however the instant embodiment is not limited to the example provided herein. The memory unit 17 in the instant embodiment may be implemented by a volatile or a non-volatile memory such as a flash memory, a read only memory, or a random access memory, however the instant embodiment is not limited to the example provided herein.

The transmission interface unit 19 is a wireless transmission interface e.g., a Bluetooth interface, or a Wi-Fi interface. The type, actual structure, and/or implementation method associated with the transmission interface unit 19 is configured according to the type and actual structural of the host computer and the optical input device 10, thus the present disclosure is not limited thereto.

It should be noted that the internal structure of the optical input device 10 may vary according to specific design structure and/or operational requirement of the optical input device 10. In other words, FIG. 1 is merely adopted for illustrating the wake up method of the optical input device 10 and the present disclosure is not limited thereto. Similarly, FIG. 2 is merely adopted for illustrating the wake up operation of the optical input device 10 and the present disclosure is not limited thereto.

(Another Exemplary Embodiment of an Optical Input Device)

As described previously, the predetermined threshold used for determined whether the optical input device 10 is stationary or in motion may be configured according to the operating conditions thereof. Please refer to FIG. 3, which shows a diagram illustrating an optical input device provided in accordance to the present disclosure.

Figure 3:
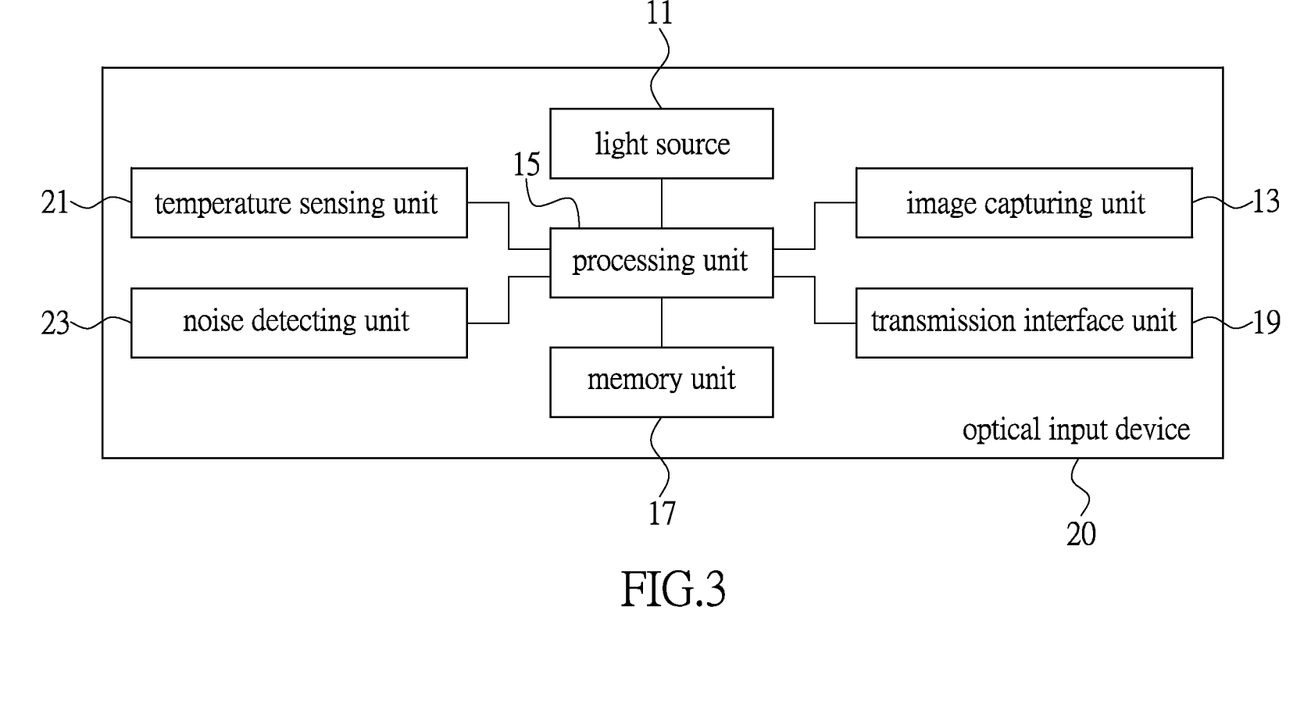
FIG. 3 is a block diagram illustrating an optical input device provided in accordance to an exemplary embodiment of the present disclosure.

The basic structure and operation of the optical input device 20 are essentially the same as the optical input device 10 of FIG. 1. The optical input device 20 can be configured to dynamically adjust the predetermined threshold according to the operating condition such that the optical input device 20 can effectively and accurately determine when to wake up during the sleep mode.

The difference between the optical input device 20 of FIG. 3 and the optical input device 10 of FIG. 1 is in that the optical input device 20 further includes the temperature sensing unit 21 and the noise detecting unit 23. The optical input device 20 is capable of detecting the operating conditions. The temperature sensing unit 21 and the noise detecting unit 23 are respectively coupled to the processing unit 15.

In instant embodiment, the temperature sensing unit 21 may be implemented by a temperature sensor such as thermistor having resistance vary according the temperature sensed. The noise detecting unit 23 may be configured to detect noise based on the frames captured during normal operation (i.e. in active mode) so as to generate the noise level detected correspondingly.

The processing unit 15 can operatively control the temperature sensing unit 21 and the noise detecting unit 23 to detect the instant operating condition of the optical input device 20 when the optical input device 20 has just started to operate (e.g., turned on by a user or wirelessly connected to a host computer). Or in another embodiment, the processing unit 15 may also regularly (e.g., at a constantly rate or after every predetermined interval) control the temperature sensing unit 21 and the noise detecting unit 23 to detect the operating condition during the normal operation of the optical input device 20.

To put it concretely, the processing unit 15 can control the temperature sensing unit 21 to detect an operating temperature of the optical input device 20. At the same time, the processing unit 15 can operatively control the noise detecting unit 23 to detect a noise level of the image capturing unit 13 of the optical input device 20. The processing unit 15 thus can operatively adjust the predetermined threshold HIS_TH according to at least one of the operating temperature and the noise level detected.

Particularly, when the operating temperature exceeds a normal operating temperature range or the noise level exceeds the tolerable noise level causing the operation of the image capturing device 13 of the optical input device 20 to become unstable, the processing unit 15 lowers the predetermined threshold HIS_TH currently stored in the memory unit 17. That is when the operation of the image capturing unit 13 becomes unstable, the processing unit 15 wakes up the optical input device 10 after detects significantly changes between the compare frame IMG_CMP and the reference frame IMG_REF.

When the operating temperature falls within a normal operating temperature range or the noise level lies within the tolerable noise level, the processing unit 15 increases the predetermined threshold HIS_TH currently stored in the memory unit 17. That is when the operation of the image capturing unit 13 operate stably, the processing unit 15 wakes up the optical input device 10 when detects subtle changes between the compare frame IMG_CMP and the reference frame IMG_REF.

In another embodiment, the processing unit 15 can be configured to calibrate the operating conditions of the optical input device 20 according to the predetermined threshold HIS_TH. More specifically, the processing unit 15 can be programmed to generate a calibrating function and calibrates the operating conditions accordingly, wherein the calibrating function is generated according to the predetermined threshold and at least an operation temperature detected and a noise level of the image capturing unit 13 detected through firmware design.

To put it concretely, the processing unit 15 may operatively configure the instant operating temperature of the optical input device 20 and the noise level of the image capturing unit 13 according to the calibrating function at given predetermined threshold HIS_TH.

More specifically, the processing unit 15 may correspondingly adjust the operating temperature according to the calibrating function. The processing unit 15 may through configuring the predetermined frame rate adjust the operating temperature to a specific level. Similarly, the processing unit 15 may compensates the discrepancies found in each pixel of the image capturing unit 13 according to the calibrating function. Such that by using the calibrating function, the operating conditions and the predetermined threshold can collectively yield the most optimal image detection result. Calibration of image capturing unit 13 are well known techniques to those skilled in the art, hence further descriptions are hereby omitted.

It worth to note that, the processing unit 15 may also transmit the detected operating temperature and the noise level to the host computer to have the host computer computing the predetermined threshold HIS_TH, accordingly so as to reduce the operating load of the optical input device 10.

The operation and the rest of the structure of the optical input device 20 is essentially the same as the optical input device 10 of FIG. 1 and based on the above elaborations, those skilled in the art should be able to infer the operation associated with the optical input device 20, hence further descriptions are therefore omitted.

(Another Exemplary Embodiment of an Optical Input Device)

Figure 4:
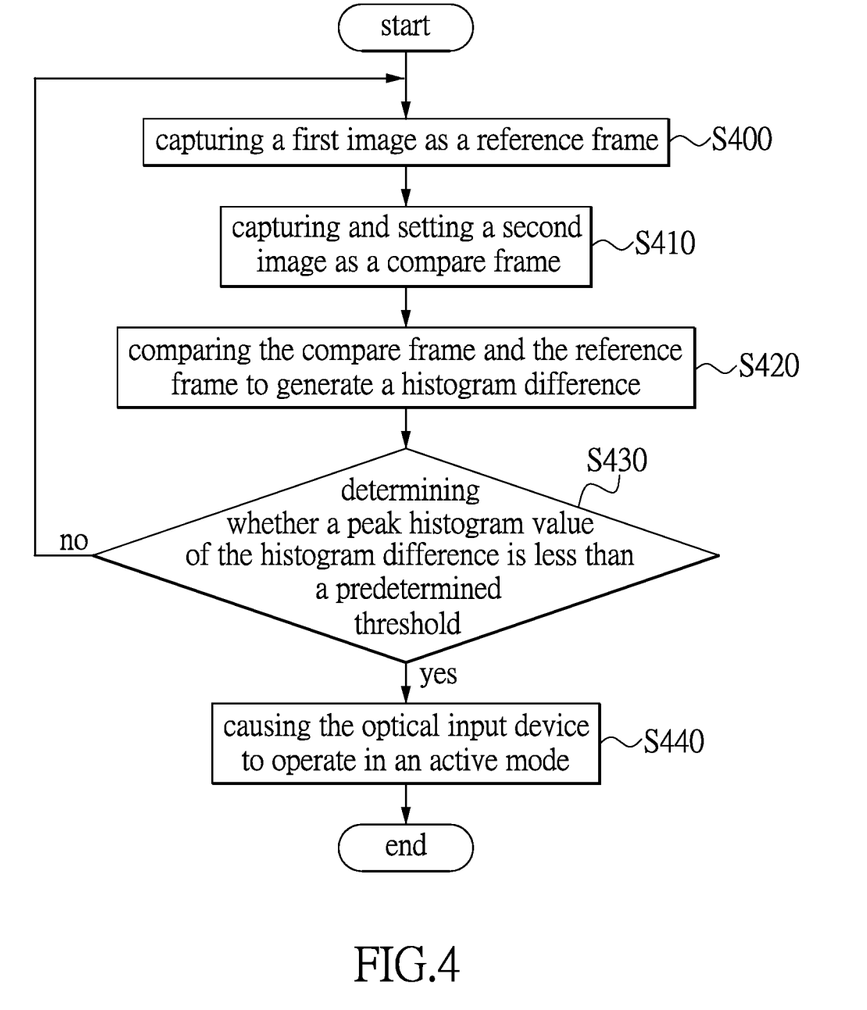
FIG. 4 is a flowchart diagram illustrating a wake up method provided in accordance to an exemplary embodiment of the present disclosure.

From the aforementioned exemplary embodiment, the present disclosure may generalize a wake up method which can be applied to the optical input device illustrated in the aforementioned embodiment. Please refer to FIG. 4 in conduction with FIG. 1. FIG. 4 shows a flowchart diagram illustrating a wake up method provided in accordance to an exemplary embodiment of the present disclosure.

In Step S400, When the optical input device 10 enters the sleep mode (i.e., after being idled for a period of time) the processing unit 15 controls the image capturing unit 13 capturing a first image to set as the reference frame IMG_REF. The processing unit 15 also stores pixelated data the first image in the memory unit 17.

In Step S410, the processing unit 15 controls the image capturing unit 13 capturing a second image at the predetermined frame rate, i.e., the sleep mode frame rate predefined to set as the compare frame IMG_CMP. The pixelated data of second image is stored a in the memory unit 17 until the next consecutive second image is captured.

While the optical input device 10 operates in the sleep mode the image capturing unit 13 operatively controlled to sequentially captures a plurality of second image according to the sleep mode frame rate to generate the compare frames IMG_CMP.

Subsequently, in Step S420, the processing unit 15 compares the compare frame IMG_CMP instantly captured and the reference frame IMG_REF to generate a histogram difference. Particularly, the processing unit 15 compares each pixel value in the compare frame IMG_CMP with the corresponding pixel value in the reference frame IMG_REF to compute the pixel difference. Then the process unit 15 computes the histogram difference from the pixel difference. The processing unit 15 can also store the histogram difference in the memory unit 17 for further access.

In Step S430, the processing unit 15 determines whether a peak histogram value of the histogram difference is less than a predetermined threshold. The processing unit 15 can first acquire the peak histogram value from the histogram difference computed and compare the peak histogram value with the predetermined threshold. It is worth to note that the predetermined threshold HIS_TH in the instant embodiment may be predefined in the memory unit 17 according to operational requirement.

When the processing unit 15 determines that the peak histogram value of the histogram difference less than the predetermined threshold HIS_TH indicating that the optical input device 10 has been moved, the processing unit 15 executes Step S440; otherwise, returns to Step S440 and the processing unit 15 continues to drive the image capturing unit 13 capture another second image.

In Step 440, the processing unit 15 operatively causes the optical input device 10 to wake up and operate in the active mode. While the optical input device 10 operates in the active mode, the processing unit 15 analyzes a movement of the optical input device 10 based on the frames captured by the image capturing unit 13 at a predetermined frame rate of active mode (e.g., an active mode frame rate) so as to generated a displacement information to control a movement of a cursor.

Additionally, in one embodiment, the wake up method disclosed in FIG. 4 may be implemented stored a series of program code in the memory unit 17 processed and executed by the processing unit 15. In another embodiment, the described wake up method may be implemented by writing firmware into the processing unit 15. The predetermined frame rate such as active mode frame rate and the sleep mode frame rate may be configured by the processing unit 15 according to the actual operational requirements of the optical input device 20.

Figure 5:
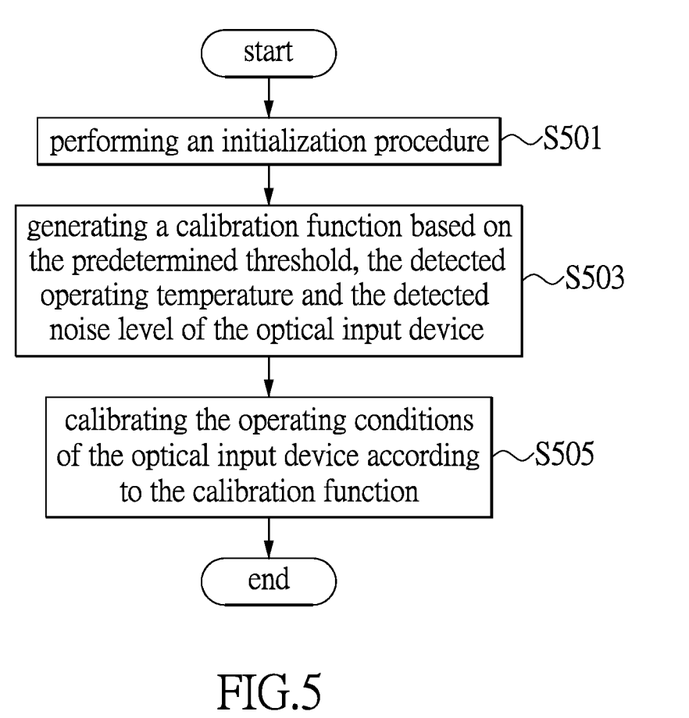
FIG. 5 is a flowchart diagram illustrating a calibration method for the optical input device provided in accordance to an exemplary embodiment of the present disclosure.

Next, based on the above explanation, the present disclosure may further generalize a configuration method for the predetermined threshold HIS_TH in the aforementioned embodiment. Please refer to FIG. 5 in conjunction with FIG. 3, wherein FIG. 5 shows a flowchart diagram illustrating a calibration method for the optical input device provided in accordance to the exemplary embodiment of the present disclosure.

In Step S501, the processing unit 15 performs an initialization procedure to calibrate the operating conditions of the optical input device 20. In Step S503, the processing unit 15 generates a calibration function based on the predetermined threshold HIS_TH predefined in the memory unit 17, a predefined operating temperature of the optical input device 20, and a predefined noise level of image capturing unit 13. The predetermined threshold HIS_TH may be predefined according to the operational requirement of the optical input device 20 and/or manufacturing parameters before factory shipment of the optical input device 20. While the optical input device 20 operates in active mode, the processing unit 15 may calibrate the operating conditions of the optical input device according the calibration function. (Step S505).

Specifically, the processing unit 15 may control the temperature sensing unit 21 to detect the instant operating temperature and the noise detecting unit 23 to detect the noise level of the image capturing unit 13. The processing unit 15 then calibrates the instant operating conditions according to the calibrating functions.

Figure 6:
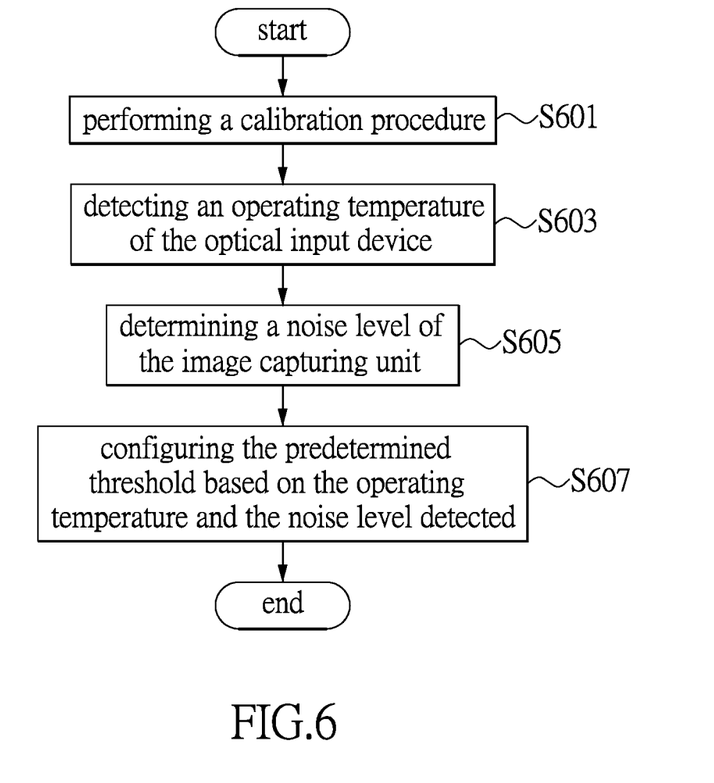
FIG. 6 is a flowchart diagram illustrating a method for configuring the predetermined threshold provided in accordance to an exemplary embodiment of the present disclosure.

The present disclosure also provides a method for configuring the predetermined threshold HIS_TH according to the operating conditions detected. Please refer to FIG. 6 in conjunction with FIG. 3 wherein FIG. 6 shows a flowchart diagram illustrating a method for configuring the predetermined threshold provided in accordance to the exemplary embodiment of the present disclosure.

In Step S601, the processing unit 15 performs a calibration procedure. The calibration procedure may be executed when the optical input device 20 is turned on or executed regularly (e.g., after every predetermined interval or before entering the sleep mode).

In Step S603, the processing unit 15 controls the temperature sensing unit 21 to detect an operating temperature of the optical input device 20. In Step 605, the processing unit 15 at same time controls the noise detecting unit 23 to determine a noise level of the image capturing unit 13 of the optical input device 20. In Step S607, the processing unit 15 operatively configures the predetermined threshold HIS_TH based on the operating temperature and the noise level detected. The processing unit 15 further stores the predetermined threshold HIS_TH configured in the memory unit 17 after the calibration procedure.

Accordingly, the optical input device 20 may through either dynamically configure the predetermined threshold HIS_TH or calibrating operating conditions provides accurately and effectively movement detection.

Methods depicted by FIG. 5 and FIG. 6 may also be implemented by firmware design, i.e. writing corresponding firmware into the nonvolatile memory of processing unit 15. Or the predetermined threshold configuration method and the calibration method may be stored as series of program code in the memory unit 17 which is processed and executed by the processing unit 15 during the operation of the optical input device 20.

In summary, the present disclosure provides a wake up method and an optical input device using the same. The wake up method can accurately determine whether the optical input device has been moved by statistically analyzing a histogram of pixel difference between the frames captured during sleep mode. The optical input device thus can effectively and automatically determine when to wake up from sleep mode using the wake up method while consume less power as the degree of computation complexity for implementing the wake up method is greatly reduced.

Additionally, the optical input device can dynamically configure a threshold comparison for analyze the histogram obtained according to the operating condition (e.g., operating temperature, and noise level of image capturing unit) so as to determine whether to wake up the optical input device during the sleep mode. The optical input device may also capable for calibrating the operating conditions thereof according to the threshold predefined for accurately determines the movement of the optical input device.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A wake up method of an optical input device, the method comprising:
   a) capturing and setting a first image as a reference frame when the optical input device enters a sleep mode;
   b) capturing and setting a second image as a compare frame while the optical input device operates in the sleep mode;
   c) comparing the compare frame and the reference frame to generate a histogram difference;
   d) determining whether a peak histogram value of the histogram difference is less than a predetermined threshold; and
   e) causing the optical input device to operate in an active mode when the peak histogram value of the histogram difference is less than the predetermined threshold;
   wherein step c) further comprises:
   comparing each pixel value in the compare frame with the corresponding pixel value in the reference frame;
   computing the histogram difference based on the comparison result; and
   obtaining the peak histogram value of the histogram difference.

2. The wake up method according to claim 1, further comprising:
   f) re-executing step b) to step d) when determines that the peak histogram value of the histogram difference is greater than the predetermined threshold.

3. The wake up method according to claim 1, wherein the step before the step a) comprises:
   configuring the predetermined threshold according to an operating condition of an image capturing unit of the optical input device.

4. The wake up method according to claim 3, wherein the step before the step a) comprises:
   detecting an operating temperature of the optical input device by a temperature sensing unit; and
   adjusting the predetermined threshold according to the operating temperature detected.

5. The wake up method according to claim 3, wherein the step before the step a) comprises:
   determining a noise level of an image capturing unit of the optical input device by a noise detecting unit; and
   adjusting the predetermined threshold according to the noise level determined.

6. The wake up method according to claim 1, wherein the steps before the step a) comprise:
   generating a calibrating function according to the predetermined threshold and at least one of an operating temperature and a noise level of the optical input device detected; and
   calibrating the operating condition of the optical input device according to the calibrating function.

7. The wake up method according to claim 1, wherein the step b) comprises:
   capturing the second image at a predetermined frame rate while the optical input device operates in the sleep mode.

8. An optical input device, comprising:
   a light source, illuminating a working surface of the optical input device;
   an image capturing unit, configured for capturing a plurality of images responsive to a reflected light of the working surface to generate a plurality of frames according to a predetermined frame rate; and
   a processing unit, coupled to the light source and the image capturing unit, analyzing a movement of the optical input device based on the frames captured;
   wherein, the processing unit operatively controls the image capturing unit to capture a first image as a reference frame when the optical input device enters a sleep mode and a second image as a compare frame while the optical input device operates in the sleep mode, the processing unit further comparing the compare frame with the reference frame to generate a histogram difference;
   wherein, when the processing unit determines that a peak histogram value of the histogram difference is less than a predetermined threshold, the processing unit drives the optical input device into an active mode;
   wherein the step of comparing the compare frame with the reference frame to generate the histogram difference further comprises:
   comparing each pixel value in the compare frame with the corresponding pixel value in the reference frame;
   computing the histogram difference based on the comparison result; and
   obtaining the peak histogram value of the histogram difference.

9. The optical input device according to claim 8, further comprising:
   a memory unit, coupled to the processing unit, storing the reference frame, the compare frame, the histogram difference, and the predetermined threshold.

10. The optical input device according to claim 8, further comprising:
    a temperature sensing unit, coupled to the processing unit, detecting an operating temperature of the optical input device; and
    a noise detecting unit, coupled to the processing unit, detecting a noise level of the image capturing unit of the optical input device.

11. The optical input device according to claim 10, wherein the processing unit adjusts the predetermined threshold according to at least one of the operating temperature and the noise level.

12. The optical input device according to claim 10, wherein the processing unit generates a calibrating function according to the predetermined threshold and at least the operation temperature, the noise level, and calibrates the operating condition of the optical input device according to the calibrating function.

13. The optical input device according to claim 8, wherein when the processing unit determines that the peak histogram value of the histogram difference is greater than a predetermined threshold, the processing unit continues to drive the optical input device operating in the sleep mode.

14. The optical input device according to claim 8, wherein when the optical input device operates in the sleep mode, the predetermined frame rate is a sleep mode frame rate of the optical input device; when the optical input device operates in the active mode, the predetermined frame rate is an active mode frame rate of the optical input device, wherein the sleep mode frame rate is smaller than the active mode frame rate.

15. The optical input device according to claim 8, wherein the optical input device is an optical mouse.

16. The optical input device according to claim 8, wherein the light source comprises of at least a light-emitting diode.

* * * * *